(12) United States Patent
Ge et al.

(10) Patent No.: US 8,646,055 B2
(45) Date of Patent: *Feb. 4, 2014

(54) METHOD AND SYSTEM FOR PRE-SHARED-KEY-BASED NETWORK SECURITY ACCESS CONTROL

(75) Inventors: Li Ge, Shaanxi (CN); Jun Cao, Shaanxi (CN); Manxia Tie, Shaanxi (CN); Qin Li, Shaanxi (CN); Zhenhai Huang, Shaanxi (CN)

(73) Assignee: China Iwncomm Co., Ltd., Xi'an (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/391,526

(22) PCT Filed: Dec. 24, 2009

(86) PCT No.: PCT/CN2009/075975
§ 371 (c)(1),
(2), (4) Date: Feb. 21, 2012

(87) PCT Pub. No.: WO2011/022915
PCT Pub. Date: Mar. 3, 2011

(65) Prior Publication Data
US 2012/0159587 A1    Jun. 21, 2012

(30) Foreign Application Priority Data

Aug. 25, 2009  (CN) .......................... 2009 1 0023685

(51) Int. Cl.
*G06F 21/00*    (2013.01)
(52) U.S. Cl.
USPC ............... 726/6; 726/1; 726/2; 726/3; 726/4; 726/5; 713/168; 713/169; 713/170; 713/171; 380/277; 380/278; 380/279
(58) Field of Classification Search
USPC .................................. 726/1–6; 713/168–171
See application file for complete search history.

(56) References Cited

U.S. PATENT DOCUMENTS 7,516,485 B1* 4/2009 Lee et al. ................. 726/11
7,975,140 B2* 7/2011 Fedyk et al. .............. 713/171

(Continued)

FOREIGN PATENT DOCUMENTS

CN    1564509 A    1/2005
CN    1728637 A    2/2006

(Continued)

OTHER PUBLICATIONS

GB/T 15629.3-1995 (corresponding to ISO/IEC 8802.3), "Information processing systems—Local area networks—Part 3: Carrier sense multiple access with collision detection (CSMA/CD) access method and physical layer specifications," Jun. 21, 1995.

(Continued)

*Primary Examiner* — David Pearson
*Assistant Examiner* — Josnel Jeudy
(74) *Attorney, Agent, or Firm* — Harness, Dickey & Pierce, P.L.C.

(57) ABSTRACT

A method and system for pre-shared-key-based network access control are disclosed. The method includes the following steps: 1) security policy negotiation is implemented between a REQuester (REQ) and Authentication Access Controller (AAC); 2) identity authentication and uni-cast key negotiation are implemented between REQ and AAC; 3) a group-cast key is notified between REQ and AAC. Applying the method and system, rapid bidirectional authentication can be implemented between a user and network.

12 Claims, 2 Drawing Sheets

(56) References Cited

U.S. PATENT DOCUMENTS

| | | | |
|---|---|---|---|
| 7,996,888 B2* | 8/2011 | Asunmaa et al. | 726/9 |
| 8,417,955 B2 | 4/2013 | Tie et al. | |
| 2003/0167336 A1* | 9/2003 | Iwamoto et al. | 709/229 |
| 2006/0227807 A1* | 10/2006 | Jakubik et al. | 370/466 |
| 2006/0276209 A1* | 12/2006 | Neves et al. | 455/466 |
| 2008/0080713 A1* | 4/2008 | Cho et al. | 380/273 |
| 2008/0227548 A1* | 9/2008 | Choudhry et al. | 463/42 |
| 2009/0276828 A1* | 11/2009 | Swander et al. | 726/1 |

FOREIGN PATENT DOCUMENTS

| | | | |
|---|---|---|---|
| CN | 1953367 A | 4/2007 | |
| CN | 101155396 A | 4/2008 | |
| CN | 101345765 A | 1/2009 | |
| JP | 11215146 A | 8/1999 | |
| JP | 2006295341 A | 10/2006 | |
| WO | WO-2005/060150 A1 | 6/2005 | |
| WO | WO-2009076879 A1 | 6/2009 | |

OTHER PUBLICATIONS

IEEE Std 802.3™—2005 (Revision of IEEE Std 802.3-2002 including all approved amendments); IEEE Standard for Information technology—Telecommunications and information exchange between systems—Local and metropolitan area networks—Specific Requirements. Part 3: Carrier sense multiple access with collision detection (CSMA/CD) access method and physical layer specifications. IEEE Computer Society, IEEE, New York, NY, USA, Dec. 9, 2005.

IEEE Std 802.3™—2008 (Revision of IEEE Std 802.3-2005); IEEE Standard for Information technology—Telecommunications and information exchange between systems—Local and metropolitan area networks—Specific requirements. Part 3: Carrier sense multiple access with collision detection (CSMA/CD) access method and physical layer specifications. IEEE Computer Society, IEEE, New York, NY, USA, Dec. 26, 2008.

IEEE Std 802.1X™—2004 (Revision of IEEE Std 802.1X-2001); IEEE Standard for Local and metropolitan area networks—Port-Based Network Access Control, IEEE Computer Society, IEEE New York, NY, USA, Dec. 13, 2004.

International Search Report (in Chinese with English translation) and Written Opinion (in Chinese) for PCT/CN2009/075975, mailed May 20, 2010; ISA/CN.

Mastering TCP/IP IPsec. 2006. Summary provided by Unitalen Attorneys At Law.

D. Maughan et al. "Internet Security Association and Key Management Protocol (ISAKMP)." Network Working Group. Nov. 1998.

S. Kent and K. Leo. "Security Architecture for the Internet Procotol." Network Working Group. Dec. 2005.

D. Harkins and D. Carrel. "The Internet Key Exchange (IKE)." Network Working Group. Nov. 1998.

\* cited by examiner

METHOD AND SYSTEM FOR PRE-SHARED-KEY-BASED NETWORK SECURITY ACCESS CONTROL

CROSS-REFERENCE TO RELATED APPLICATIONS

This application is a 371 U.S. National Stage of International Application No. PCT/CN2009/075975, filed Dec. 24, 2009, which claims priority to Chinese Patent Application No. 200910023685.0, filed Aug. 25, 2009. The disclosures of the above applications are incorporated fully herein by reference.

The present application claims the benefit of priority to Chinese patent application No. 200910023685.0, titled "METHOD AND SYSTEM FOR PRE-SHARED-KEY BASED NETWORK SECURITY ACCESS CONTROL", filed on Aug. 25, 2009 with Chinese State Intellectual Property Office, which is hereby incorporated by reference in its entirety.

FIELD OF THE INVENTION

The present invention relates to a method and system of pre-shared-key-based network security access control, and in particular to a method and system for pre-shared-key authentication mechanism based security access control in a wired local area network (LAN) while users access the network.

BACKGROUND OF THE INVENTION

The wired LAN is generally a broadcast network, in which data sent by a node may be received by all other nodes. Channels are shared by the nodes in the network, which has brought great insecurity to the network. As long as a hacker accesses the network to monitor, he/she can capture all packets on the network to steal off key information.

The local area network LAN, which is defined by the existing Chinese national standard GB 15629.3 (corresponding to ISO/IEC 8802.3), does not provide a secure access, and as long as the user can access the LAN control device (for example, a LAN Switch), he/she can access equipments or resources in the LAN. There was no obvious risk in the wired LAN application environment of early enterprise network; but with the large-scale development of the network, the user's requirements on information privacy continue to increase, and it is necessary to achieve user-level security access control and data confidentiality.

For the wired LAN, IEEE is currently carrying out security enhancements on the IEEE802.3 to achieve the security of the data link layer, using typical security access architecture protocols IEEE 802.1x, IEEE802.1x authentication-based key management protocols and so on. Basic authentication method of IEEE802.1x is to use authentication servers in addition to the terminals and access point devices, and the access point devices use the authentication servers to authenticate the identity of the terminals and thus realize secure access control on the terminals. The access point devices directly forward the identification information between the terminals and the authentication servers, rather than participate in the process of identity authentication as separate entities. This mode only realizes the network authentication on the validity of the terminal identity; it can not meet the requirements for terminal authentication on the validity of the access network, and can not realize the bidirectional authentication between the terminals and the network. This authentication method is complex in procedure and can not implement rapid identity authentication and key management, so it can not support authentication protocols of different security levels, and can not meet the various needs of users.

SUMMARY OF THE INVENTION

In order to solve technical problems mentioned above, this invention provides a method and system of pre-shared-key-based network security access control, which can implement rapid bidirectional authentication between a user and a network.

Technical solutions of this invention are: this invention provides a method of pre-shared-key-based network security access control, which includes:
1) performing a security policy negotiation between a REQuester (REQ) and an Authentication Access Controller (AAC);
2) performing an identity authentication and unicast key negotiation between the REQ and the AAC;
3) notifying a multicast key between the REQ and the AAC.

The step 1) includes:

1.1) requesting for the security policy negotiation: when the REQ accesses the AAC, sending, by the AAC, a security policy negotiation request message to the REQ, the security policy negotiation request message including a $TIE_{AAC}$ field;
where:
the $TIE_{AAC}$ field represents a Tri-element peer authentication (TePA) information element supported by the AAC, and the TePA information element includes authentication and key management suites and cipher suites which are supported by the ACC;

1.2) responding the security policy negotiation: after the REQ receives the security policy negotiation request message, performing:
selecting, by the REQ, according to the authentication and key management suits and the cipher suits supported by the AAC in the $TIE_{AAC}$ field of the security policy negotiation request message and in combination with a local policy, a common authentication and key management suit and a common cipher suit for the REQ and the AAC, constituting a security policy negotiation response message and sending the security policy negotiation response message to the AAC; if the REQ does not support any of the authentication and key management suits or the cipher suits supported by the AAC in the security policy negotiation request message, discarding the security policy negotiation request message according to the local policy; the security policy negotiation response message including a $TIE_{REQ}$ field;
where:
the $TIE_{REQ}$ field represents a TePA information element selected by the REQ, and the TePA information element includes the authentication and key management suit and the cipher suit selected by REQ; and 1.3) after the AAC receives the security policy negotiation response message, performing:
1.3.1) determining, by the AAC, whether the authentication and key management suit and the cipher suit selected by the REQ are supported by the AAC; if not, discarding the security policy negotiation response message; and if supported, proceeding to 1.3.2); and
1.3.2) beginning the corresponding identity authentication according to the authentication and key management suit and the cipher suit selected by the REQ.

In the above-described step 1.3), when the authentication and key management suit selected by the REQ is a pre-shared-key-based authentication and key management suit, a pre-shared-key-based LAN authentication protocol (SAAP)

is used in the identity authentication to complete a bidirectional identity authentication between the REQ and the AAC and to complete a unicast key negotiation between the REQ and the AAC.

The step 2) includes:

2.1) activating the identity authentication and unicast key negotiation: when the REQ and the AAC negotiate to select the pre-shared-key-based authentication and key management suit in the security policy negotiation, sending, by the AAC, an identity authentication and unicast key negotiation activation message to the REQ for activating the REQ to start the identity authentication and unicast key negotiation, the identity authentication and unicast key negotiation activation message including a $N_{AAC}$ field, where:

the $N_{AAC}$ field represents an identity authentication and unicast key negotiation identification; if the identity authentication and unicast key negotiation is performed for the first time, the $N_{AAC}$ field is a random number generated by the ACC; and if the identity authentication and unicast key negotiation is an updated identity authentication and unicast key negotiation process, the $N_{AAC}$ field has a value of the identity authentication and unicast key negotiation identification which is calculated in a previous identity authentication and unicast key negotiation process;

2.2) requesting for the identity authentication and unicast key negotiation: after REQ receives identity authentication and unicast key negotiation activation message, performing:

2.2.1) if the identity authentication and unicast key negotiation is the updated identity authentication and unicast key negotiation process, checking, by the REQ, whether the identity authentication and unicast key negotiation identification in the $N_{AAC}$ field of the identity authentication and unicast key negotiation activation message is consistent with the identity authentication and unicast key negotiation identification calculated in the previous identity authentication and unicast key negotiation process; if the identity authentication and unicast key negotiation identification in the $N_{AAC}$ field is not consistent with the identity authentication and unicast key negotiation identification calculated in the previous identity authentication and unicast key negotiation process, discarding the identity authentication and unicast key negotiation activation message; and if the identity authentication and unicast key negotiation identification in the $N_{AAC}$ field is consistent with the identity authentication and unicast key negotiation identification calculated in the previous identity authentication and unicast key negotiation process, proceeding to 2.2.2); if the identity authentication and unicast key negotiation process is performed for the first time, proceeding to 2.2.2);

2.2.2) generating, by the REQ, a REQ challenge $N_{REQ}$, calculating a unicast key and the identity authentication and unicast key negotiation identification $N_{AAC}$ for a next identity authentication and unicast key negotiation process by using the pre-shared-key, the identity authentication and unicast key negotiation identification $N_{AAC}$ and the REQ challenge $N_{REQ}$, and storing the unicast key and the identity authentication and unicast key negotiation identification $N_{AAC}$ for the next identity authentication and unicast key negotiation process, where the unicast key includes a protocol data key (PDK) and a unicast key (UDK), the PDK is adapted to protect privacy of key data in protocol data and integrity of the protocol data between the REQ and the AAC, and the UDK is adapted to protect privacy and integrity of user data between the REQ and the AAC; and 2.2.3) locally calculating, by the REQ, a message identifying code MIC1 by using the PDK, constituting an identity authentication and unicast key negotiation request message and sending the identity authentication and unicast key negotiation request message to the AAC;

where if REQ needs to initiate the updated identity authentication and unicast key negotiation process, the steps 2.2.2) and 2.2.3) are performed directly, a value of the identity authentication and unicast key negotiation identification $N_{AAC}$ field depends on the identity authentication and unicast key negotiation identification calculated in the previous identity authentication and unicast key negotiation process, and the identity authentication and unicast key negotiation request message is constituted and sent to the AAC without waiting for the AAC to send the identity authentication and unicast key negotiation activation message in advance; and where the identity authentication and unicast key negotiation request message includes a $N_{REQ}$ filed, a $N_{AAC}$ field, a $TIE_{REQ}$ filed and a MIC1 field, in which:

the $N_{REQ}$ field represents the REQ challenge and is a random number generated by the REQ, the $N_{AAC}$ field represents the identity authentication and unicast key negotiation identification; if the identity authentication and unicast key negotiation process is performed for the first time, the value of the $N_{AAC}$ field directly dependents on the value of the $N_{AAC}$ field in the identity authentication and unicast key negotiation activation message; and if the identity authentication and unicast key negotiation process is the updated identity authentication and unicast key negotiation process, the value of the $N_{AAC}$ field is the value of the identity authentication and unicast key negotiation identification which is calculated in the previous identity authentication and unicast key negotiation process;

the $TIE_{REQ}$ field represents the authentication and key management suit and the cipher suit selected by the REQ, and has a same value as that of the $TIE_{REQ}$ field in the security policy negotiation response message; and the MIC1 field represents a message identifying code, which is a hash value calculated by the REQ from all the fields in the identity authentication and unicast key negotiation request message besides the MIC1 field with the generated PDK;

2.3) responding the identity authentication and unicast key negotiation: after the AAC receives the identity authentication and unicast key negotiation request message, performing:

2.3.1) when the identity authentication and unicast key negotiation process is the updated identity authentication and unicast key negotiation process, checking whether the $N_{AAC}$ field in the identity authentication and unicast key negotiation request message is consistent with the identity authentication and unicast negotiation identification calculated in the previous identity authentication and unicast key negotiation process, if the $N_{AAC}$ field in the identity authentication and unicast key negotiation request message is not consistent with the identity authentication and unicast negotiation identification calculated in the previous identity authentication and unicast key negotiation process, discarding the identity authentication and unicast key negotiation request message, and if the $N_{AAC}$ field in the identity authentication and unicast key negotiation request message is consistent with the identity authentication and unicast negotiation identification calculated in the previous identity authentication and unicast key negotiation process, proceeding to 2.3.2); when the identity authentication and unicast key negotiation process is performed for the first time, checking whether the $N_{AAC}$ field of the identity authentication and unicast key negotiation request message is consistent with the $N_{AAC}$ field of the identity authentication and unicast negotiation activation message, if the $N_{AAC}$ field of the identity authentication and unicast key negotiation request message is not consistent with the $N_{AAC}$ field of the identity authentication and unicast negotiation activation message, discarding the identity authentication and unicast key negotiation request message, and if the $N_{AAC}$ field of the identity authentication and unicast key negotiation request message is consistent with the $N_{AAC}$ field of the identity authentication and unicast negotiation activation message, proceeding to 2.3.2);

2.3.2) verifying whether the $TIE_{REQ}$ field is consistent with the $TIE_{REQ}$ field of the security policy negotiation response message received in the security policy negotiation, if the $TIE_{REQ}$ field is not consistent with the $TIE_{REQ}$ field of the security policy negotiation response message received in the security policy negotiation, discarding the identity authentication and unicast key negotiation request message, and if the $TIE_{REQ}$ field is consistent with the $TIE_{REQ}$ field of the security policy negotiation response message received in the security policy negotiation, proceeding to 2.3.3);

2.3.3) calculating a unicast key and the identity authentication and unicast key negotiation identification $N_{AAC}$ for a next identity authentication and unicast key negotiation process by using the pre-shared-key, the identity authentication and unicast key negotiation identification $N_{AAC}$ and the REQ challenge $N_{REQ}$, and storing the unicast key and the identity authentication and unicast key negotiation identification $N_{AAC}$ for the next identity authentication and unicast key negotiation process, where the unicast key includes a protocol data key (PDK) and a unicast key (UDK);

2.3.4) verifying the MIC1 field of the identity authentication and unicast key negotiation request message with the PDK, if a value of the MIC1 is not correct, discarding the identity authentication and unicast key negotiation request message; and if the value of the MIC1 is correct, completing, by the AAC, the identity authentication of the REQ and negotiating the unicast key between the AAC and the REQ, and then proceeding to 2.3.5); and 2.3.5) locally calculating a message identifying code MIC2 with the PDK, constituting an identity authentication and unicast key negotiation response message and sending the identity authentication and unicast key negotiation response message to the REQ;

where the identity authentication and unicast key negotiation response message include a $N_{REQ}$ field, a $TIE_{AAC}$ field and a MIC2 field;
in which:
the $N_{REQ}$ field represents the REQ challenge and is a random number generated by the REQ, which has a same value as the $N_{REQ}$ field in the identity authentication and unicast key negotiation request message;
the $TIE_{AAC}$ field represents the authentication and key management suits and the cipher suits supported by the AAC, which has a same value as the $TIE_{AAC}$ field in the security policy negotiation request message; and
the MIC2 field represents a message identifying code, which is a hash value calculated by the AAC from all the fields in the identity authentication and unicast key negotiation response message besides the MIC2 field and the negotiated identity authentication and unicast key negotiation identification $N_{AAC}$ for the next identity authentication and unicast key negotiation process with the generated PDK; and 2.4) after the REQ receives the identity authentication and unicast key negotiation response message, performing:
2.4.1) checking whether the $N_{REQ}$ field in the identity authentication and unicast key negotiation response message is the same as the $N_{REQ}$ field in the identity authentication and unicast negotiation request message previously sent, if not, discarding the identity authentication and unicast key negotiation response message, and if yes, proceeding to 2.4.2);

2.4.2) verifying whether the $TIE_{AAC}$ field in the identity authentication and unicast key negotiation response message is consistent with the $TIE_{AAC}$ field of the security policy negotiation request message received in the security policy negotiation process, if not, discarding the identity authentication and unicast key negotiation response message, and if yes, proceeding to 2.4.3);

2.4.3) verifying a value of the MIC2 field of the identity authentication and unicast key negotiation response message by using the PDK, if the value of the MIC2 field is not correct, discarding the identity authentication and unicast key negotiation response message, and if the value of the MIC2 field is correct, completing, by the REQ, the identity authentication of AAC, negotiating the common unicast key between the AAC and the REQ, and proceeding to 2.4.4); and 2.4.4) locally calculating a MIC3 with the PDK, constituting an identity authentication and unicast key negotiation confirmation message, and sending the identity authentication and unicast key negotiation confirmation message to the AAC; the identity authentication and unicast key negotiation confirmation message being optional.

The identity authentication and unicast key negotiation confirmation message include a $N_{AAC}$ field and a MIC3 field,
in which:
the $N_{AAC}$ field represents an identity authentication and unicast key negotiation identification, and has a same value as the $N_{AAC}$ field of the identity authentication and unicast key negotiation request message; and
the MIC3 field represents a message identifying code, which is a hash value calculated by the REQ from all the fields in the identity authentication and unicast key negotiation response message besides the MIC3 field and the negotiated identity authentication and unicast key negotiation identification for the next identity authentication and unicast key negotiation process with the generated PDK.

2.5) After the AAC receives the identity authentication and unicast key negotiation confirmation message, performing:
2.5.1) checking whether a value of the $N_{AAC}$ field in the identity authentication and unicast key negotiation confirmation message is the same as that of the $N_{AAC}$ field in the identity authentication and unicast negotiation request message, if not, discarding the identity authentication and unicast key negotiation confirmation message, and if yes, proceeding to 2.5.2); and 2.5.2) verifying the MIC3 field of the identity authentication and unicast key negotiation confirmation message by using the PDK, if a value of the MIC3 field is not correct, discarding the identity authentication and unicast key negotiation confirmation message, and if the value of the MIC3 field is correct, confirming, by the AAC, that the REQ has acquired a unicast key consistent with that of the AAC.

The step 3) includes:
3.1) notifying the multicast key:
a multicast key notification message including a KN field, a $E_{MDK}$ field and a MIC4 field;
in which:
the KN field represents a key notification identification, which is initialized to be an integer and is incremented by 1 for each key update notification, and is kept constant if the notified key is unchanged;
the $E_{MDK}$ field represents key-encrypted data, which is generated by the AAC via encrypting multicast data key (MDK) with the PDK generated in the identity authentication and unicast key negotiation process, where the MDK is a random number generated by the AAC, and is adapted to protect a secure communication of the multicast data after secure access; and the MIC4 field represents a message identifying code, which is calculated by the AAC from all the fields in the multicast key notification message besides the MIC5 field with the PDK generated in the identity authentication and unicast key negotiation process;

3.2) responding the multicast key:

after the REQ receives the multicast key notification message, performing:

3.2.1) checking whether the KN field is monotonically increasing, if not, discarding the multicast key notification message, and if yes, proceeding to 3.2.2);

3.2.2) verifying the MIC4 field by using the PDK generated in the identity authentication and unicast key negotiation process, if the MIC4 field is not correct, discarding the multicast key notification message, and if the MIC4 field is correct, proceeding to 3.2.3);

3.2.3) decrypting the $E_{MDK}$ field with the PDK generated in the identity authentication and unicast key negotiation process to obtain the MDK; and 3.2.4) storing the value of the key notification identification KN field, generating a multicast key response message, and sending the multicast key response message to the AAC, where the multicast key response message include a KN field and a MIC5 field;

in which:

the KN field represents a key notification identification, and has a same value as the KN field of the multicast key notification message; and the MIC5 field represents a message identifying code, which is calculated by the REQ from all the fields in the multicast key response message besides the MIC5 field with the PDK generated in the identity authentication and unicast key negotiation process; and 3.3) after the AAC receives the multicast key response message, performing:

3.3.1) determining whether the KN field in the multicast key response message is consistent with the KN field of the multicast key notification message previously sent, if not, discarding the multicast key response message, and if yes, proceeding to 3.3.2); and 3.3.2) verifying the MIC5 field by using the PDK generated in the identity authentication and unicast key negotiation process, if the value of the MIC5 field is not correct, discard the multicast key response message, and if the value of the MIC5 field is correct, completing the process of notifying the multicast key to the REQ.

A system of pre-shared-key-based network security access control, including a REQuester (REQ) and an Authentication Access Controller (AAC), where the AAC is connected to the REQ, and provides service ports for the REQ.

In the method and system of pre-shared-key-based network security access control provided by the present invention, the identity authentication process and the unicast key negotiation process are combined together, in which the unicast key negotiation is completed while the identity authentication process is completed without a third party being involved, thereby simplifying the process and calculation of the security access control and achieving rapid secure access.

DETAILED DESCRIPTION OF THE INVENTION

The invention is explained in detail below by the specific embodiments in combination with the drawings.

Figure 1:
FIG. 1 is a diagram of the security policy negotiation process in the invention.
Figure 2:
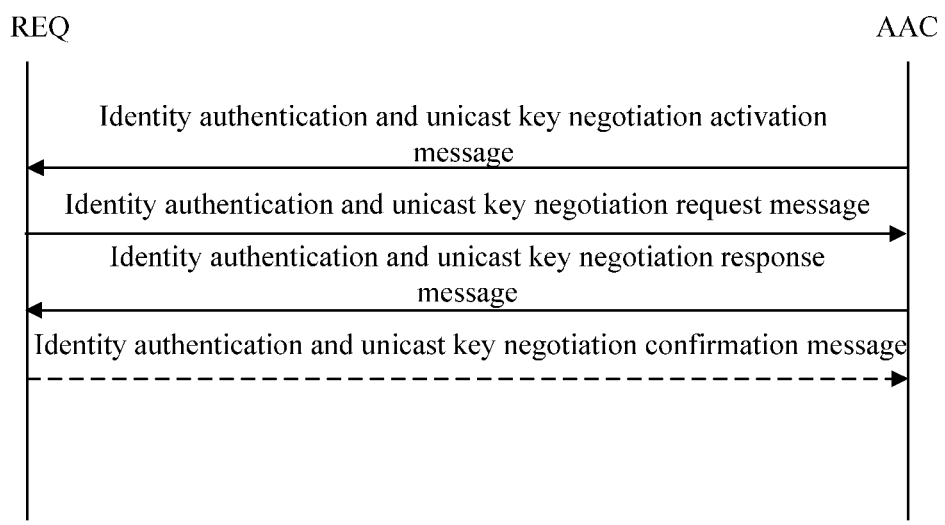
FIG. 2 is a diagram of the identity identification and unicast key negotiation process of the SAAP in the invention.
Figure 3:
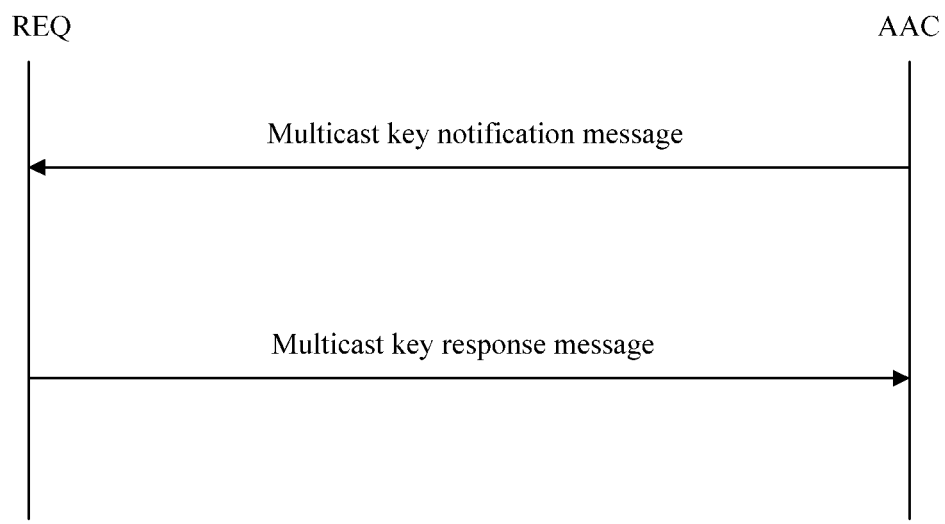
FIG. 3 is a diagram of the multicast key notification process in the invention.

FIG. 1 is the diagram of the security policy negotiation process in the invention; FIG. 2 is the diagram of the identity identification and unicast key negotiation process of the SAAP in the invention; and FIG. 3 is the diagram of the multicast key notification process in the invention. Referring to FIGS. 1-3, the present invention provides a wired LAN secure access control method. The method is divided into three parts: the security policy negotiation process, the identity authentication and unicast key negotiation process and the multicast key notification process. The detailed description is as follows:

1) The security policy negotiation process is shown in FIG. 1, which is as follows:

1.1) requesting for the security policy negotiation: when the REQ (REQuester) accesses the AAC (Authentication Access Controller), the AAC sends a security policy negotiation request message to the REQ.

The main content of the security policy negotiation request message includes:

Where:

$TIE_{AAC}$ field: represents a Tri-element peer authentication (TePA) information element supported by the AAC, and the TePA information element includes the authentication and key management suits and the cipher suits supported by the AAC.

1.2) responding the security policy negotiation: after the REQ receives the security policy negotiation request message, the process is as follows:

According to the authentication and key management suits and the cipher suits supported by AAC in the $TIE_{AAC}$ field of the security policy negotiation request and in combination with a local policy, the REQ selects the common authentication and key management suit and the common cipher suit shared by the REQ and the AAC, constitutes a security policy negotiation response message and sends the security policy negotiation response message to AAC; if REQ does not support any of the authentication and key management suits and cipher suits supported by the AAC in the security policy negotiation request message, the security policy negotiation request message according to the local policy is discarded.

The main content of the security policy negotiation response message includes:

in which:

$TIE_{REQ}$ field: represents TePA information element selected by the REQ, and the TePA information element includes the authentication and key management suit and the cipher suit selected by the REQ.

1.3) After AAC receives the security policy negotiation response message, the process is as follows:

1.3.1) AAC determines whether the authentication and key management suit and the cipher suit selected by the REQ are supported by the AAC, if not, then the security policy negotiation response message is discarded; if supported, then 1.3.2) is performed;

1.3.2) The corresponding identity authentication process begins according to the authentication and key management suit and the cipher suit selected by REQ.

In the present invention, there is provided a shared-key-based lAn authentication protocol (SAAP).

2) The SAAP process is shown is FIG. 2, in which the identity authentication is completed while the unicast key negotiation is implemented. The specific process is as follows:

2.1) activating the identity authentication and unicast key negotiation: When REQ and AAC negotiate to select the pre-shared-key authentication and key management suit in the security policy negotiation process, AAC sends an identity authentication and unicast key negotiation activation message to REQ for activating the REQ to start the identity authentication and unicast key negotiation process. The main content of the identity authentication and unicast key negotiation activation message includes:

| $N_{AAC}$ |
|---|

In which:

$N_{AAC}$ field: represents an identity authentication and unicast key negotiation identification, if the identity authentication and unicast key negotiation is performed for the first time, the field is a random number generated by the ACC; and if the identity authentication and unicast key negotiation is an updated identity authentication and unicast key negotiation process, the field has a value of the identity authentication and unicast key negotiation identification which is calculated in the previous identity authentication and unicast key negotiation process;

2.2) requesting for the identity authentication and unicast key negotiation: after REQ receives identity authentication and unicast key negotiation activation message, the process is as follows:

2.2.1) If the identity authentication and unicast key negotiation process is the updated identity authentication and unicast key negotiation process, REQ checks whether the identity authentication and unicast key negotiation identification $N_{AAC}$ field of the identity authentication and unicast key negotiation activation message is consistent with the identity authentication and unicast key negotiation identification calculated in the previous identity authentication and unicast key negotiation process, if not, the identity authentication and unicast key negotiation activation message is discarded; if yes, 2.2.2) is performed; and if the identity authentication and unicast key negotiation process is performed for the first time, then 2.2.2) is directly performed;

2.2.2) The REQ generates a REQ challenge $N_{REQ}$, calculates a unicast key and the identity authentication and unicast key negotiation identification $N_{AAC}$ for the next identity authentication and unicast key negotiation process by using the pre-shared-key, the identity authentication and unicast key negotiation identification $N_{AAC}$ and REQ challenge $N_{REQ}$, and stores the unicast key and the identity authentication and unicast key negotiation identification $N_{AAC}$ for the next identity authentication and unicast key negotiation process, where the unicast key includes a protocol data key (PDK) and a unicast key (UDK). PDK is used to protect the privacy of the key data in protocol data and integrity of the protocol data between the REQ and the AAC, and the UDK is used to protect the privacy and integrity of the user data between the REQ and the AAC;

2.2.3) REQ locally calculates a message identifying code MIC1 using PDK, constructs an identity authentication and unicast key negotiation request message and sends the identity authentication and unicast key negotiation request message to AAC.

Notes: if REQ needs to initiate the updated identity authentication and unicast key negotiation, then the above 2.2.2) and 2.2.3) are directly implemented, where a value of the identity authentication and unicast key negotiation identification $N_{AAC}$ field depends on the identity authentication and unicast key negotiation identification value calculated in the previous identity authentication and unicast key negotiation process, and the identity authentication and unicast key negotiation request message is constituted and sent to AAC without waiting for the AAC to send the identity authentication and unicast key negotiation activation message in advance.

The main content of identity authentication and unicast key negotiation request message includes:

| $N_{REQ}$ | $N_{AAC}$ | $TIE_{REQ}$ | MIC1 |
|---|---|---|---| in which:

$N_{REQ}$ field: represents the REQ challenge and is a random number generated by the REQ;

$N_{AAC}$ field: represents the identity authentication and unicast key negotiation identification; if the identity authentication and unicast key negotiation process is performed for the first time, the value of the $N_{AAC}$ field directly dependents on the value of the $N_{AAC}$ field in the identity authentication and unicast key negotiation activation message; and if the identity authentication and unicast key negotiation process is the updated identity authentication and unicast key negotiation process, the value of the $N_{AAC}$ field is the value of the identity authentication and unicast key negotiation identification which is calculated in the previous identity authentication and unicast key negotiation process;

$TIE_{REQ}$ field: represents the authentication and key management suit and the cipher suit selected by the REQ; its value is same as the $TIE_{REQ}$ field value of security policy negotiation response message;

MIC1 field: represents a message identifying code, which is a hash value calculated by REQ from all the fields of the identity authentication and unicast key negotiation request message besides the MIC1 field with the generated PDK.

2.3) Responding the identity authentication and unicast key negotiation response: after AAC receives the identity authentication and unicast key negotiation request message, the process is as follows:

2.3.1) If the identity authentication and unicast key negotiation process is the updated process, whether $N_{AAC}$ field of the message is consistent with the identity authentication and unicast negotiation identification calculated in the previous identity authentication and unicast key negotiation process is checked; if not, then the message is discarded, and if yes, then 2.3.2) is performed. If the key negotiation process is performed for the first time, then whether $N_{AAC}$ field of the message is consistent with $N_{AAC}$ field of the identity authentication and unicast negotiation activation message is checked, if not, then the message is discarded, and if yes, then 2.3.2) is performed;

2.3.2) Whether $TIE_{REQ}$ field is consistent with $TIE_{REQ}$ field of security policy negotiation response message received in the security policy negotiation process is checked, if not, then the message is discarded, and if yes, then 2.3.3) is performed;

2.3.3) The unicast key and the identity authentication and unicast key negotiation identification $N_{AAC}$ for the next identity authentication and unicast key negotiation process is calculated by using the pre-shared-key, the identity authentication and unicast key negotiation identification $N_{AAC}$ and the REQ challenge $N_{REQ}$, and then is stored, where the unicast key includes PDK and UDK;

2.3.4) The correctness of the MIC1 field in the identity authentication and unicast key negotiation request message is verified by using the PDK, if it is not correct, then the message is discarded, and if it is correct, the AAC completes the identity authentication of REQ, negotiates the unicast key between the AAC and the REQ, and then 2.3.5) is performed;

2.3.5) A message identifying code MIC1 is locally calculated with the PDK, an identity authentication and unicast key negotiation response message is constructed and sent to the REQ.

The main content of the identity authentication and unicast key negotiation response message includes:

| $N_{REQ}$ | $TIE_{AAC}$ | MIC2 | in which:

$N_{REQ}$ field: represents the REQ challenge and is a random number generated by the REQ. Its value is as the same as with the $N_{REQ}$ field value of the identity authentication and unicast key negotiation request message;

$TIE_{AAC}$ field: represents the authentication and key management suits and the cipher suits supported by the AAC; its value is the same as the $TIE_{AAC}$ field value of the security policy negotiation request message;

MIC2 field: represents a message identifying code, which is a hash value calculated by AAC from all the fields of the identity authentication and unicast key negotiation response message besides the MIC1 field and the negotiated identity authentication and unicast key negotiation identification $N_{AAC}$ for the next identity authentication and unicast key negotiation process with the generated PDK.

2.4) after the REQ receives the identity authentication and unicast key negotiation response message, the process is as follows:

2.4.1) Whether $N_{REQ}$ field is the same as the $N_{REQ}$ field of the identity authentication and unicast negotiation request message previously sent is checked, if not, then the message is discarded, and if yes, then 2.4.2) is performed;

2.4.2) Whether $TIE_{AAC}$ field value is consistent with $TIE_{AAC}$ field value of security policy negotiation response message received in the security policy negotiation process is verified, if not, then the message is discarded, and if yes, then 2.4.3) is performed;

2.4.3) The correctness of MIC2 field of the identity authentication and unicast key negotiation response message is verified by using the PDK, if it is not correct, then the message is discarded, and if it is correct, the REQ completes the identity authentication of AAC, negotiates the common unicast key between AAC and REQ, and then 2.4.4) is performed; and 2.4.4) A message identifying code MIC3 is locally calculated with the PDK, an identity authentication and unicast key negotiation confirmation message is constructed and sent to AAC; the identity authentication and unicast key negotiation confirmation message is optional, that is, REQ may send the unicast key negotiation confirmation message to AAC, or may not send the unicast key negotiation confirmation message to AAC.

The main content of the identity authentication and unicast key negotiation confirmation message includes:

| $N_{AAC}$ | MIC3 | in which:

$N_{AAC}$ field: represents an identity authentication and unicast key negotiation identification, and its value is the same as $N_{AAC}$ field value of the identity authentication and unicast key negotiation request message;

MIC3 field: represents a message identifying code, which is a hash value calculated by REQ from all the fields of the identity authentication and unicast key negotiation response message besides MIC1 field and the negotiated identity authentication and unicast key negotiation identification of the next identity authentication and unicast key negotiation process with the generated PDK.

2.5) after AAC receives the identity authentication and unicast key negotiation confirmation message, the process is as follows:

2.5.1) whether $N_{AAC}$ field value is the same as $N_{AAC}$ field value of the identity authentication and unicast negotiation request message is checked, if not, then the message is discarded, and if yes, then 2.5.2) is performed;

2.5.2) the correctness of MIC3 field of the identity authentication and unicast key negotiation confirmation message is verified by using PDK, if it is not correct, then the message is discarded, and if it is correct, AAC confirms that REQ has acquired the unicast key consistent with that of the AAC.

3) The multicast key notification message process is shown in FIG. 3, and the specific process is as follows 3.1) multicast key notification:

The main content of the multicast key notification message includes:

| KN | $E_{MDK}$ | MIC4 | in which:

KN field: represents the key notification identification, which is initialized to be an integer and is incremented by 1 for each key update notification, and is kept constant if the notified key is unchanged;

$E_{MDK}$ field: represents key-encrypted data, which is generated by the AAC via encrypting the multicast data key (MDK) with the PDK generated in the identity authentication and unicast key negotiation process, where MDK is a random number generated by AAC, and is used to protect the secure communication of the multicast data after secure access; and MIC4 field: represents a message identifying code, which is calculated by AAC from all the fields besides MIC4 field of the multicast key request message with the PDK generated in the identity authentication and unicast key negotiation process.

3.2) responding the multicast key:

After REQ receives the multicast key notification message, the process is as follows:

3.2.1) Whether KN field is monotonically increasing is checked, if not, then the message is discarded, and if yes, then 3.2.2) is performed;

3.2.2) MIC4 field is verified by using the PDK generated in the identity authentication and unicast key negotiation process, if not, then the message is discarded, and if yes, then 3.2.3) is performed;

3.2.3) The $E_{MDK}$ field is verified by using the PDK generated in the identity authentication and unicast key negotiation process to obtain the MDK; and 3.2.4) the value of key notification identification KN field is stored, and a multicast key response message is generated and sent to AAC.

The main content of the multicast key response message includes:

| KN | MIC5 |
|----|------| in which:

KN field: represents the key notification identification, and its value is the same as KN field of the multicast key notification message;

MIC5 field: represents message identifying code, which is calculated by REQ from all the fields besides MIC5 field of the multicast key response message with the PDK generated in the identity authentication and unicast key negotiation process.

3.3) After AAC receives the multicast key response message, the process is as follows:

3.3.1) Whether KN field is consistent with the KN field value of the multicast key notification message previously sent is determined, if not, then the message is discarded, and if yes, then 3.3.2) is performed; and 3.3.2) The correctness of the MIC5 field is verified by using the PDK generated in the identity authentication and unicast key negotiation process, if not, then the message is discarded, and if yes, then the process of notifying the multicast key notification to the REQ is completed.

When the AAC successfully completes the process of notifying the multicast key to the REQ, data transmitted between the AAC and the REQ can be communicated secretly by using the negotiated or notified unicast data key and multicast data key.

In addition to the method of pre-shared-key-based network security access control, the present invention further provides a system of pre-shared-key-based network security access control pre-shared key-based access control. The control system includes a REQ and a AAC; the ACC is connected to the REQ, and provides service ports for the REQ.

By the description of the above embodiments, it should be clearly understood by the ordinary skilled people in the art that the present invention can be implemented by hardware, or can be implemented by software and a necessary universal hardware platform. Based on this understanding, the technical solutions of the invention can be embodied in the form of software products. The software product can be stored in a nonvolatile storage medium (CD-ROM, U disk, mobile hard disk etc.), with a number of instructions for enabling a computer device (which may be a personal computer, a server or a network device, etc.) to perform the methods of the various embodiments of the invention.

Finally, it should be noted that the above embodiments are only intended to explain the technical solutions of the invention rather than limit the invention; although the invention has been described in detail with reference to the above embodiments, the ordinary skilled people in the art should be understood that modifications may be made to the technical solutions recorded in the foregoing embodiments, or equivalent replacement may be made to some technical features; and the modifications and replacements do not make the nature of the technical solutions departs from the spirit and scope of the various embodiments of the invention.

What is claimed is:

1. A system of pre-shared-key-based network security access control, comprising a REQuester (REQ) and an Authentication Access Controller (AAC), wherein the REQ and the AAC are network devices, and wherein the AAC is connected to the REQ, and provides service ports for the REQ;

the REQ to perform a security policy negotiation with the AAC, wherein, a common authentication and key management suit and a common cipher suit for the REQ and the AAC is determined, and perform an identity authentication and perform an unicast key negotiation according to the authentication determined in security policy negotiation with the AAC, the REQ to access the AAC and receive a security policy negotiation request message to the REQ sent from the AAC; wherein the security policy negotiation request message comprises a TIEAAC field and the TIEAAC field representing a Tri-element peer authentication (TePA) information element supported by the AAC, and the TePA information element comprises authentication and key management suits and cipher suits which are supported by the ACC;

the REQ to select the common authentication and key management suit and the common cipher suit for the REQ and the AAC according to the authentication and key management suits and the cipher suits supported by the AAC in the TIEAAC field of the security policy negotiation request message and in combination with a local policy; to constitute a security policy negotiation response message and to send the security policy negotiation response message to the AAC; if the REQ does not support any of the authentication and key management suits or the cipher suits supported by the AAC in the security policy negotiation request message, the REQ to discard the security policy negotiation request message according to the local policy, wherein the security policy negotiation response message comprises a TIEREQ field and the TIEREQ field representing a TePA information element selected by the REQ, and the TePA information element comprises the authentication and key management suit and the cipher suit selected by REQ; and the AAC to determine whether the authentication and key management suit and the cipher suit selected by the REQ are supported by the AAC; if not, the AAC to discard the security policy negotiation response message; and if supported, the AAC to begin the corresponding identity authentication according to the authentication and key management suit and the cipher suit selected by the REQ;

the AAC to perform a security policy negotiation with the REQ and to perform an identity authentication and perform an unicast key negotiation according to the authentication determined in security policy negotiation with the REQ, wherein an unicast key is established; and the AAC to notify the REQ of a multicast key according to the unicast key established during the unicast key negotiation between the REQ and the AAC.

2. A method of pre-shared-key-based network security access control, comprising:

1) performing a security policy negotiation between a REQuester (REQ) and an Authentication Access Controller (AAC);

2) performing an identity authentication and unicast key negotiation between the REQ and the AAC; and 3) notifying a multicast key between the REQ and the AAC;

wherein the step1) comprises:

1.1) requesting for the security policy negotiation: when the REQ accesses the AAC, sending, by the AAC, a security policy negotiation request message to the REQ, the security policy negotiation request message comprising a $TIE_{AAC}$ field;

wherein the $TIE_{AAC}$ field represents a Tri-element peer authentication (TePA) information element supported by the AAC, and the TePA information element comprises authentication and key management suits and cipher suits which are supported by the ACC;

1.2) responding the security policy negotiation: after the REQ receives the security policy negotiation request message, performing:

selecting, by the REQ, according to the authentication and key management suits and the cipher suits supported by the AAC in the $TIE_{AAC}$ field of the security policy negotiation request message and in combination with a local policy, a common authentication and key management suit and a common cipher suit for the REQ and the AAC, constituting a security policy negotiation response message and sending the security policy negotiation response message to the AAC; if the REQ does not support any of the authentication and key management suits or the cipher suits supported by the AAC in the security policy negotiation request message, discarding the security policy negotiation request message according to the local policy; the security policy negotiation response message comprising a $TIE_{REQ}$ field;

wherein the $TIE_{REQ}$ field represents a TePA information element selected by the REQ, and the TePA information element comprises the authentication and key management suit and the cipher suit selected by REQ; and 1.3) after the AAC receives the security policy negotiation response message, performing:

1.3.1) determining, by the AAC, whether the authentication and key management suit and the cipher suit selected by the REQ are supported by the AAC; if not, discarding the security policy negotiation response message; and if supported, proceeding to 1.3.2); and 1.3.2) beginning the corresponding identity authentication according to the authentication and key management suit and the cipher suit selected by the REQ.

3. A method of pre-shared-key-based network security access control, comprising:

1) performing a security policy negotiation between a REQuester (REQ) and an Authentication Access Controller (AAC), wherein the REQ and the AAC are network devices, and;

2) performing an identity authentication and unicast key negotiation between the REQ and the AAC; and 3) notifying a multicast key between the REQ and the AAC;

wherein the step 3) comprises:

3.1) notifying the multicast key:

a multicast key notification message comprising a KN field, a $E_{MDK}$ field and a MIC4 field;

wherein:

the KN field represents a key notification identification, which is initialized to be an integer and is incremented by 1 for each key update notification, and is kept constant if the notified key is unchanged;

the $E_{MDK}$ field represents key-encrypted data, which is generated by the AAC via encrypting multicast data key (MDK) with the PDK generated in the identity authentication and unicast key negotiation process, wherein the MDK is a random number generated by the AAC, and is adapted to protect a secure communication of the multicast data after secure access; and the MIC4 field represents a message identifying code, which is calculated by the AAC from all the fields in the multicast key notification message besides the MIC5 field with the PDK generated in the identity authentication and unicast key negotiation process;

3.2) responding the multicast key:

after the REQ receives the multicast key notification message, performing:

3.2.1) checking whether the KN field is monotonically increasing, if not, discarding the multicast key notification message, and if yes, proceeding to 3.2.2);

3.2.2) verifying the MIC4 field by using the PDK generated in the identity authentication and unicast key negotiation process, if the MIC4 field is not correct, discarding the multicast key notification message, and if the MIC4 field is correct, proceeding to 3.2.3);

3.2.3) decrypting the $E_{MDK}$ field with the PDK generated in the identity authentication and unicast key negotiation process to obtain the MDK; and 3.2.4) storing the value of the key notification identification KN field, generating a multicast key response message, and sending the multicast key response message to the AAC, wherein the multicast key response message comprise a KN field and a MIC5 field;

the KN field represents a key notification identification, and has a same value as the KN field of the multicast key notification message; and the MIC5 field represents a message identifying code, which is calculated by the REQ from all the fields in the multicast key response message besides the MIC5 field with the PDK generated in the identity authentication and unicast key negotiation process; and 3.3) after the AAC receives the multicast key response message, performing:

3.3.1) determining whether the KN field in the multicast key response message is consistent with the KN field of the multicast key notification message previously sent, if not, discarding the multicast key response message, and if yes, proceeding to 3.3.2); and 3.3.2) verifying the MIC5 field by using the PDK generated in the identity authentication and unicast key negotiation process, if the value of the MIC5 field is not correct, discard the multicast key response message, and if the value of the MIC5 field is correct, completing the process of notifying the multicast key to the REQ.

4. The method of pre-shared-key-based network security access control according to claim 2, wherein in the step 1.3.2), when the authentication and key management suit selected by the REQ is a pre-shared-key-based authentication and key management suit, a pre-shared-key-based LAN authentication protocol (SAAP) is used in the identity authentication to complete a bidirectional identity authentication between the REQ and the AAC and to complete a unicast key negotiation between the REQ and the AAC.

5. The method of pre-shared-key-based network security access control according to claim 4, wherein the step 2) comprises:

2.1) activating the identity authentication and unicast key negotiation: when the REQ and the AAC negotiate to select the pre-shared-key-based authentication and key management suit in the security policy negotiation, sending, by the AAC, an identity authentication and unicast key negotiation activation message to the REQ for activating the REQ to start the identity authentication and unicast key negotiation, the identity authentication and unicast key negotiation activation message comprising a $N_{AAC}$ field, wherein the $N_{AAC}$ field represents an identity authentication and unicast key negotiation identification; if the identity authentication and unicast key negotiation is performed for a first time, the $N_{AAC}$ field is a random number generated by the ACC; and if the identity authentication and unicast key negotiation is an updated identity authentication and unicast key negotiation process, the $N_{AAC}$ field has a value of the identity authentication and unicast key negotiation identification which is calculated in a previous identity authentication and unicast key negotiation process;

2.2) requesting for the identity authentication and unicast key negotiation: after REQ receives identity authentication and unicast key negotiation activation message, performing:

2.2.1) if the identity authentication and unicast key negotiation is the updated identity authentication and unicast key negotiation process, checking, by the REQ, whether the identity authentication and unicast key negotiation identification in the $N_{AAC}$ field of the identity authentication and unicast key negotiation activation message is consistent with the identity authentication and unicast key negotiation identification calculated in the previous identity authentication and unicast key negotiation process; if the identity authentication and unicast key negotiation identification in the $N_{AAC}$ field is not consistent with the identity authentication and unicast key negotiation identification calculated in the previous identity authentication and unicast key negotiation process, discarding the identity authentication and unicast key negotiation activation message; and if the identity authentication and unicast key negotiation identification in the $N_{AAC}$ field is consistent with the identity authentication and unicast key negotiation identification calculated in the previous identity authentication and unicast key negotiation process, proceeding to 2.2.2); if the identity authentication and unicast key negotiation process is performed for the first time, proceeding to 2.2.2);

2.2.2) generating, by the REQ, a REQ challenge $N_{REQ}$, calculating a unicast key and the identity authentication and unicast key negotiation identification $N_{AAC}$ for a next identity authentication and unicast key negotiation process by using the pre-shared-key, the identity authentication and unicast key negotiation identification $N_{AAC}$ and the REQ challenge $N_{REQ}$, and storing the unicast key and the identity authentication and unicast key negotiation identification $N_{AAC}$ for the next identity authentication and unicast key negotiation process, wherein the unicast key comprises a protocol data key (PDK) and a unicast key (UDK), the PDK is adapted to protect privacy of key data in protocol data and integrity of the protocol data between the REQ and the AAC, and the UDK is adapted to protect privacy and integrity of user data between the REQ and the AAC; and 2.2.3) locally calculating, by the REQ, a message identifying code MIC1 by using the PDK, constituting an identity authentication and unicast key negotiation request message and sending the identity authentication and unicast key negotiation request message to the AAC;

wherein if the REQ needs to initiate the updated identity authentication and unicast key negotiation process, the steps 2.2.2) and 2.2.3) are performed directly, a value of the identity authentication and unicast key negotiation identification $N_{AAC}$ field depends on the identity authentication and unicast key negotiation identification calculated in the previous identity authentication and unicast key negotiation process, and the identity authentication and unicast key negotiation request message is constituted and sent to the AAC without waiting for the AAC to send the identity authentication and unicast key negotiation activation message in advance; and wherein the identity authentication and unicast key negotiation request message comprises a $N_{REQ}$ filed, a $N_{AAC}$ field, a $TIE_{REQ}$ filed and a MICI field, the $N_{REQ}$ field represents the REQ challenge and is a random number generated by the REQ, the $N_{AAC}$ field represents the identity authentication and unicast key negotiation identification; if the identity authentication and unicast key negotiation process is performed for the first time, the value of the $N_{AAC}$ field directly dependents on the value of the $N_{AAC}$ field in the identity authentication and unicast key negotiation activation message; and if the identity authentication and unicast key negotiation process is the updated identity authentication and unicast key negotiation process, the value of the $N_{AAC}$ field is the value of the identity authentication and unicast key negotiation identification which is calculated in the previous identity authentication and unicast key negotiation process;

the $TIE_{REQ}$ field represents the authentication and key management suit and the cipher suit selected by the REQ, and has a same value as that of the $TIE_{REQ}$ field in the security policy negotiation response message; and the MICI field represents a message identifying code, which is a hash value calculated by the REQ from all the fields in the identity authentication and unicast key negotiation request message besides the MIC1 field with the generated PDK;

2.3) responding the identity authentication and unicast key negotiation: after the AAC receives the identity authentication and unicast key negotiation request message, performing:

2.3.1) when the identity authentication and unicast key negotiation process is the updated identity authentication and unicast key negotiation process, checking whether the $N_{AAC}$ field in the identity authentication and unicast key negotiation request message is consistent with the identity authentication and unicast negotiation identification calculated in the previous identity authentication and unicast key negotiation process, if the $N_{AAC}$ field in the identity authentication and unicast key negotiation request message is not consistent with the identity authentication and unicast negotiation identification calculated in the previous identity authentication and unicast key negotiation process, discarding the identity authentication and unicast key negotiation request message, and if the $N_{AAC}$ field in the identity authentication and unicast key negotiation request message is consistent with the identity authentication and unicast negotiation identification calculated in the previous identity authentication and unicast key negotiation process, proceeding to 2.3.2); when the identity authentication and unicast key negotiation process is performed for the first time, checking whether the $N_{AAC}$ field of the identity authentication and unicast key negotiation request message is consistent with the $N_{AAC}$ field of the identity authentication and unicast negotiation activation message, if the $N_{AAC}$ field of the identity authentication and unicast key negotiation request message is not consistent with the $N_{AAC}$ field of the identity authentication and unicast negotiation activation message, discarding the identity authentication and unicast key negotiation request message, and if the $N_{AAC}$ field of the identity authentication and unicast key negotiation request message is consistent with the $N_{AAC}$ field of the identity authentication and unicast negotiation activation message, proceeding to 2.3.2);

2.3.2) verifying whether the $TIE_{REQ}$ field is consistent with the $TIE_{REQ}$ field of the security policy negotiation response message received in the security policy negotiation, if the $TIE_{REQ}$ field is not consistent with the $TIE_{REQ}$ field of the security policy negotiation response message received in the security policy negotiation, discarding the identity authentication and unicast key negotiation request message, and if the $TIE_{REQ}$ field is consistent with the $TIE_{REQ}$ field of the security policy negotiation response message received in the security policy negotiation, proceeding to 2.3.3);

2.3.3) calculating a unicast key and the identity authentication and unicast key negotiation identification $N_{AAC}$ for a next identity authentication and unicast key negotiation process by using the pre-shared-key, the identity authentication and unicast key negotiation identification $N_{AAC}$ and the REQ challenge $N_{REQ}$, and storing the unicast key and the identity authentication and unicast key negotiation identification $N_{AAC}$ for the next identity authentication and unicast key negotiation process, wherein the unicast key comprises a protocol data key (PDK) and a unicast key (UDK);

2.3.4) verifying the MIC1 field of the identity authentication and unicast key negotiation request message with the PDK, if a value of the MIC1 is not correct, discarding the identity authentication and unicast key negotiation request message; and if the value of the MIC1 is correct, completing, by the AAC, the identity authentication of the REQ and negotiating the unicast key between the AAC and the REQ, and then proceeding to 2.3.5); and 2.3.5) locally calculating a message identifying code MIC2 with the PDK, constituting an identity authentication and unicast key negotiation response message and sending the identity authentication and unicast key negotiation response message to the REQ;

wherein the identity authentication and unicast key negotiation response message comprise a $N_{REQ}$ field, a $TIE_{AAC}$ field and a MIC2 field;

the $N_{REQ}$ field represents the REQ challenge and is a random number generated by the REQ, which has a same value as the $N_{REQ}$ field in the identity authentication and unicast key negotiation request message;

the $TIE_{AAC}$ field represents the authentication and key management suits and the cipher suits supported by the AAC, which has a same value as the $TIE_{AAC}$ field in the security policy negotiation request message; and the MIC2 field represents a message identifying code, which is a hash value calculated by the AAC from all the fields in the identity authentication and unicast key negotiation response message besides the MIC2 field and the negotiated identity authentication and unicast key negotiation identification $N_{AAC}$ for the next identity authentication and unicast key negotiation process with the generated PDK; and 2.4) after the REQ receives the identity authentication and unicast key negotiation response message, performing:

2.4.1) checking whether the $N_{REQ}$ field in the identity authentication and unicast key negotiation response message is the same as the $N_{REQ}$ field in the identity authentication and unicast negotiation request message previously sent, if not, discarding the identity authentication and unicast key negotiation response message, and if yes, proceeding to 2.4.2);

2.4.2) verifying whether the $TIE_{AAC}$ field in the identity authentication and unicast key negotiation response message is consistent with the $TIE_{AAC}$ field of the security policy negotiation request message received in the security policy negotiation, if not, discarding the identity authentication and unicast key negotiation response message, and if yes, proceeding to 2.4.3); and 2.4.3) verifying a value of the MIC2 field of the identity authentication and unicast key negotiation response message by using the PDK, if the value of the MIC2 field is not correct, discarding the identity authentication and unicast key negotiation response message, and if the value of the MIC2 field is correct, completing, by the REQ, the identity authentication of AAC, and negotiating a common unicast key between the AAC and the REQ.

6. The method of pre-shared-key-based network security access control according to claim 5, further comprising: after completing 2.4.3), performing:

2.4.4) locally calculating a MIC3 with the PDK, constituting an identity authentication and unicast key negotiation confirmation message, and sending the identity authentication and unicast key negotiation confirmation message to the AAC; the identity authentication and unicast key negotiation confirmation message being optional, wherein the identity authentication and unicast key negotiation confirmation message comprise a $N_{AAC}$ field and a MIC3 field, the $N_{AAC}$ field represents an identity authentication and unicast key negotiation identification, and has a same value as the $N_{AAC}$ field of the identity authentication and unicast key negotiation request message; and the MIC3 field represents a message identifying code, which is a hash value calculated by the REQ from all the fields in the identity authentication and unicast key negotiation response message besides the MIC3 field and the negotiated identity authentication and unicast key negotiation identification for the next identity authentication and unicast key negotiation process with the generated PDK.

7. The method of pre-shared-key-based network security access control according to claim 6, further comprising:

2.5) after the AAC receives the identity authentication and unicast key negotiation confirmation message, performing:

2.5.1) checking whether a value of the $N_{ACC}$ field in the identity authentication and unicast key negotiation confirmation message is the same as that of the $N_{ACC}$ field in the identity authentication and unicast negotiation request message, if not, discarding the identity authentication and unicast key negotiation confirmation message, and if yes, proceeding to 2.5.2); and 2.5.2) verifying the MIC3 field of the identity authentication and unicast key negotiation confirmation message by using the PDK, if a value of the MIC3 field is not correct, discarding the identity authentication and unicast key negotiation confirmation message, and if the value of the MIC3 field is correct, confirming, by the AAC, that the REQ has acquired a unicast key consistent with that of the AAC.

8. The method of pre-shared-key-based network security access control according to claim 2, wherein the step 3) comprises:

3.1) notifying the multicast key:

a multicast key notification message comprising a KN field, a $E_{MDK}$ field and a MIC4 field;

wherein:

the KN field represents a key notification identification, which is initialized to be an integer and is incremented by 1 for each key update notification, and is kept constant if the notified key is unchanged;

the $E_{MDK}$ field represents key-encrypted data, which is generated by the AAC via encrypting multicast data key (MDK) with the PDK generated in the identity authentication and unicast key negotiation process, wherein the MDK is a random number generated by the AAC, and is adapted to protect a secure communication of the multicast data after secure access; and the MIC4 field represents a message identifying code, which is calculated by the AAC from all the fields in the multicast key notification message besides the MIC5 field with the PDK generated in the identity authentication and unicast key negotiation process;

3.2) responding the multicast key:

after the REQ receives the multicast key notification message, performing:

3.2.1) checking whether the KN field is monotonically increasing, if not, discarding the multicast key notification message, and if yes, proceeding to 3.2.2);

3.2.2) verifying the MIC4 field by using the PDK generated in the identity authentication and unicast key negotiation process, if the MIC4 field is not correct, discarding the multicast key notification message, and if the MIC4 field is correct, proceeding to 3.2.3);

3.2.3) decrypting the $E_{MDK}$ field with the PDK generated in the identity authentication and unicast key negotiation process to obtain the MDK; and 3.2.4) storing a value of the key notification identification KN field, generating a multicast key response message, and sending the multicast key response message to the AAC, wherein the multicast key response message comprise a KN field and a MIC5 field;

the KN field represents a key notification identification, and has a same value as the KN field of the multicast key notification message; and the MIC5 field represents a message identifying code, which is calculated by the REQ from all the fields in the multicast key response message besides the MIC5 field with the PDK generated in the identity authentication and unicast key negotiation process; and 3.3) after the AAC receives the multicast key response message, performing:

3.3.1) determining whether the KN field in the multicast key response message is consistent with the KN field of the multicast key notification message previously sent, if not, discarding the multicast key response message, and if yes, proceeding to 3.3.2); and 3.3.2) verifying the MIC5 field by using the PDK generated in the identity authentication and unicast key negotiation process, if a value of the MIC5 field is not correct, discard the multicast key response message, and if the value of the MIC5 field is correct, completing the process of notifying the multicast key to the REQ.

9. The method of pre-shared-key-based network security access control according to claim 4, wherein the step 3) comprises:

3.1) notifying the multicast key:

a multicast key notification message comprising a KN field, a $E_{MDK}$ field and a MIC4 field;

wherein:

the KN field represents a key notification identification, which is initialized to be an integer and is incremented by 1 for each key update notification, and is kept constant if the notified key is unchanged;

the $E_{MDK}$ field represents key-encrypted data, which is generated by the AAC via encrypting multicast data key (MDK) with the PDK generated in the identity authentication and unicast key negotiation process, wherein the MDK is a random number generated by the AAC, and is adapted to protect a secure communication of the multicast data after secure access; and the MIC4 field represents a message identifying code, which is calculated by the AAC from all the fields in the multicast key notification message besides the MIC5 field with the PDK generated in the identity authentication and unicast key negotiation process;

3.2) responding the multicast key:

after the REQ receives the multicast key notification message, performing:

3.2.1) checking whether the KN field is monotonically increasing, if not, discarding the multicast key notification message, and if yes, proceeding to 3.2.2);

3.2.2) verifying the MIC4 field by using the PDK generated in the identity authentication and unicast key negotiation process, if the MIC4 field is not correct, discarding the multicast key notification message, and if the MIC4 field is correct, proceeding to 3.2.3);

3.2.3) decrypting the $E_{MDK}$ field with the PDK generated in the identity authentication and unicast key negotiation process to obtain the MDK; and 3.2.4) storing a value of the key notification identification KN field, generating a multicast key response message, and sending the multicast key response message to the AAC, wherein the multicast key response message comprise a KN field and a MIC5 field;

the KN field represents a key notification identification, and has a same value as the KN field of the multicast key notification message; and the MIC5 field represents a message identifying code, which is calculated by the REQ from all the fields in the multicast key response message besides the MIC5 field with the PDK generated in the identity authentication and unicast key negotiation process; and 3.3) after the AAC receives the multicast key response message, performing:

3.3.1) determining whether the KN field in the multicast key response message is consistent with the KN field of the multicast key notification message previously sent, if not, discarding the multicast key response message, and if yes, proceeding to 3.3.2); and 3.3.2) verifying the MIC5 field by using the PDK generated in the identity authentication and unicast key negotiation process, if a value of the MIC5 field is not correct, discard the multicast key response message, and if the value of the MIC5 field is correct, completing the process of notifying the multicast key to the REQ.

10. The method of pre-shared-key-based network security access control according to claim 5, wherein the step 3) comprises:

3.1) notifying the multicast key:
a multicast key notification message comprising a KN field, a $E_{MDK}$ field and a MIC4 field;
wherein:
the KN field represents a key notification identification, which is initialized to be an integer and is incremented by 1 for each key update notification, and is kept constant if the notified key is unchanged;
the $E_{MDK}$ field represents key-encrypted data, which is generated by the AAC via encrypting multicast data key (MDK) with the PDK generated in the identity authentication and unicast key negotiation process, wherein the MDK is a random number generated by the AAC, and is adapted to protect a secure communication of the multicast data after secure access; and
the MIC4 field represents a message identifying code, which is calculated by the AAC from all the fields in the multicast key notification message besides the MIC5 field with the PDK generated in the identity authentication and unicast key negotiation process;

3.2) responding the multicast key:
after the REQ receives the multicast key notification message, performing:
3.2.1) checking whether the KN field is monotonically increasing, if not, discarding the multicast key notification message, and if yes, proceeding to 3.2.2);
3.2.2) verifying the MIC4 field by using the PDK generated in the identity authentication and unicast key negotiation process, if the MIC4 field is not correct, discarding the multicast key notification message, and if the MIC4 field is correct, proceeding to 3.2.3);
3.2.3) decrypting the $E_{MDK}$ field with the PDK generated in the identity authentication and unicast key negotiation process to obtain the MDK; and
3.2.4) storing the value of the key notification identification KN field, generating a multicast key response message, and sending the multicast key response message to the AAC,
wherein the multicast key response message comprise a KN field and a MIC5 field;
the KN field represents a key notification identification, and has a same value as the KN field of the multicast key notification message; and
the MIC5 field represents a message identifying code, which is calculated by the REQ from all the fields in the multicast key response message besides the MIC5 field with the PDK generated in the identity authentication and unicast key negotiation process; and 3.3) after the AAC receives the multicast key response message, performing:
3.3.1) determining whether the KN field in the multicast key response message is consistent with the KN field of the multicast key notification message previously sent, if not, discarding the multicast key response message, and if yes, proceeding to 3.3.2); and
3.3.2) verifying the MIC5 field by using the PDK generated in the identity authentication and unicast key negotiation process, if the value of the MIC5 field is not correct, discard the multicast key response message, and if the value of the MIC5 field is correct, completing the process of notifying the multicast key to the REQ.

11. The method of pre-shared-key-based network security access control according to claim 6, wherein the step 3) comprises:

3.1) notifying the multicast key:
a multicast key notification message comprising a KN field, a $E_{MDK}$ field and a MIC4 field;
wherein:
the KN field represents a key notification identification, which is initialized to be an integer and is incremented by 1 for each key update notification, and is kept constant if the notified key is unchanged;
the $E_{MDK}$ field represents key-encrypted data, which is generated by the AAC via encrypting multicast data key (MDK) with the PDK generated in the identity authentication and unicast key negotiation process, wherein the MDK is a random number generated by the AAC, and is adapted to protect a secure communication of the multicast data after secure access; and
the MIC4 field represents a message identifying code, which is calculated by the AAC from all the fields in the multicast key notification message besides the MIC5 field with the PDK generated in the identity authentication and unicast key negotiation process;

3.2) responding the multicast key:
after the REQ receives the multicast key notification message, performing:
3.2.1) checking whether the KN field is monotonically increasing, if not, discarding the multicast key notification message, and if yes, proceeding to 3.2.2);
3.2.2) verifying the MIC4 field by using the PDK generated in the identity authentication and unicast key negotiation process, if the MIC4 field is not correct, discarding the multicast key notification message, and if the MIC4 field is correct, proceeding to 3.2.3);
3.2.3) decrypting the $E_{MDK}$ field with the PDK generated in the identity authentication and unicast key negotiation process to obtain the MDK; and
3.2.4) storing the value of the key notification identification KN field, generating a multicast key response message, and sending the multicast key response message to the AAC,
wherein the multicast key response message comprise a KN field and a MIC5 field;
the KN field represents a key notification identification, and has a same value as the KN field of the multicast key notification message; and
the MIC5 field represents a message identifying code, which is calculated by the REQ from all the fields in the multicast key response message besides the MIC5 field with the PDK generated in the identity authentication and unicast key negotiation process; and 3.3) after the AAC receives the multicast key response message, performing:
3.3.1) determining whether the KN field in the multicast key response message is consistent with the KN field of the multicast key notification message previously sent, if not, discarding the multicast key response message, and if yes, proceeding to 3.3.2); and
3.3.2) verifying the MIC5 field by using the PDK generated in the identity authentication and unicast key negotiation process, if the value of the MIC5 field is not correct, discard the multicast key response message, and if the value of the MIC5 field is correct, completing the process of notifying the multicast key to the REQ.

12. The method of pre-shared-key-based network security access control according to claim 7, wherein the step 3) comprises:
3.1) notifying the multicast key:
a multicast key notification message comprising a KN field, a $E_{MDK}$ field and a MIC4 field;
wherein:
the KN field represents a key notification identification, which is initialized to be an integer and is incremented by 1 for each key update notification, and is kept constant if the notified key is unchanged;
the $E_{MDK}$ field represents key-encrypted data, which is generated by the AAC via encrypting multicast data key (MDK) with the PDK generated in the identity authentication and unicast key negotiation process, wherein the MDK is a random number generated by the AAC, and is adapted to protect a secure communication of the multicast data after secure access; and
the MIC4 field represents a message identifying code, which is calculated by the AAC from all the fields in the multicast key notification message besides the MIC5 field with the PDK generated in the identity authentication and unicast key negotiation process;
3.2) responding the multicast key:
after the REQ receives the multicast key notification message, performing:
3.2.1) checking whether the KN field is monotonically increasing, if not, discarding the multicast key notification message, and if yes, proceeding to 3.2.2);
3.2.2) verifying the MIC4 field by using the PDK generated in the identity authentication and unicast key negotiation process, if the MIC4 field is not correct, discarding the multicast key notification message, and if the MIC4 field is correct, proceeding to 3.2.3);
3.2.3) decrypting the $E_{MDK}$ field with the PDK generated in the identity authentication and unicast key negotiation process to obtain the MDK; and
3.2.4) storing the value of the key notification identification KN field, generating a multicast key response message, and sending the multicast key response message to the AAC,
wherein the multicast key response message comprise a KN field and a MIC5 field;
the KN field represents a key notification identification, and has a same value as the KN field of the multicast key notification message; and
the MIC5 field represents a message identifying code, which is calculated by the REQ from all the fields in the multicast key response message besides the MIC5 field with the PDK generated in the identity authentication and unicast key negotiation process; and
3.3) after the AAC receives the multicast key response message, performing:
3.3.1) determining whether the KN field in the multicast key response message is consistent with the KN field of the multicast key notification message previously sent, if not, discarding the multicast key response message, and if yes, proceeding to 3.3.2); and
3.3.2) verifying the MIC5 field by using the PDK generated in the identity authentication and unicast key negotiation process, if the value of the MIC5 field is not correct, discard the multicast key response message, and if the value of the MIC5 field is correct, completing the process of notifying the multicast key to the REQ.

* * * * *